(12) United States Patent
Lin et al.

(10) Patent No.: US 8,755,171 B2
(45) Date of Patent: Jun. 17, 2014

(54) STACKED-TYPE SOLID ELECTROLYTIC CAPACITOR PACKAGE STRUCTURE

(75) Inventors: Ching-Feng Lin, Hsinchu County (TW);
Chi-Hao Chiu, Hsinchu (TW);
Kun-Huang Chang, Hsinchu (TW)

(73) Assignee: Apaq Technology Co., Ltd., Miaoli County (TW)

( * ) Notice: Subject to any disclaimer, the term of this patent is extended or adjusted under 35 U.S.C. 154(b) by 111 days.

(21) Appl. No.: 13/613,098

(22) Filed: Sep. 13, 2012

(65) Prior Publication Data

US 2014/0071590 A1   Mar. 13, 2014

(51) Int. Cl.
*H01G 2/10* (2006.01)
*H01G 9/08* (2006.01)

(52) U.S. Cl.
USPC .......................... 361/535; 361/541; 361/523

(58) Field of Classification Search
None
See application file for complete search history.

(56) References Cited

U.S. PATENT DOCUMENTS

| 8,094,434 B2 * | 1/2012 | Rawal et al. ............ 361/538 |
| 2007/0211414 A1 * | 9/2007 | Pelcak et al. ............ 361/541 |
| 2012/0257325 A1 * | 10/2012 | Zednickova ............ 361/306.1 |

* cited by examiner

Primary Examiner — Jayprakash N Gandhi
Assistant Examiner — Dion Ferguson
(74) Attorney, Agent, or Firm — Li & Cai Intellectual Property (USA) Office

(57) ABSTRACT

A stacked-type solid electrolytic capacitor package structure includes a capacitor unit, a package unit and a conductive unit. The capacitor unit includes a plurality of capacitors stacked on top of one another. The package unit includes a package body enclosing the capacitors. The package body has a top surface defining a package length, a package width and an effective package, and the package width is substantially between 85% and 95% of the package length. The conductive unit includes a first conductive terminal electrically connected to the positive portion of the capacitor and a second conductive terminal electrically connected to the negative portion of the capacitor. One part of the first conductive terminal and one part of the second conductive terminal are enclosed by the package body, and another part of the first conductive terminal and another part of the second conductive terminal are exposed from the package body.

10 Claims, 4 Drawing Sheets

STACKED-TYPE SOLID ELECTROLYTIC CAPACITOR PACKAGE STRUCTURE

BACKGROUND OF THE INVENTION

1. Field of the Invention

The instant disclosure relates to a capacitor package structure, and more particularly to a stacked-type solid electrolytic capacitor package structure.

2. Description of Related Art

Various applications of capacitors include home appliances, computer motherboards and peripherals, power supplies, communication products and automobiles. The capacitors are mainly used to provide filtering, bypassing, rectifying, coupling, blocking or transforming function, which play an important role in the electric and electronic products. There are different capacitors, such as aluminum electrolytic capacitors, tantalum electrolytic capacitors or laminated ceramic capacitors, in different utilization.

A typical aluminum electrolytic capacitor includes an anode foil and a cathode foil processed by surface-enlargement and/or formation treatments. The surface-enlargement treatment is performed by etching a high purity aluminum foil to increase its surface area so that a high electrical capacity can be obtained to achieve miniaturized electrolytic capacitor. The anode aluminum foil is then subjected to the formation treatment to form a dielectric surface film. A thickness of the dielectric film is related to a supply voltage of the electrolytic capacitor. Normally the cathode foil will be subjected to the formation treatment, too. However, if no formation treatment on the cathode foil, an oxide film layer will be still formed on the surface when exposed in the air. After cutting to a specific size according to design spec., a laminate made up of the anode foil, the cathode foil which is opposed to the dielectric film of the anode foil and has etched surfaces, and a separator interposed between the anode and cathode foils, is wound-up to provide an element. The wound-up element does not have any electric characteristic of the electrolytic capacitor yet until completely dipped in an electrolytic solution for driving and housed in a metallic sheathed package in cylindrical form with a closed-end equipping a releaser. Furthermore, a sealing member made of elastic rubber is inserted into an open-end section of the sheathed package, and the open-end section of the sheathed package is sealed by drawing, whereby an aluminum electrolytic capacitor is constituted.

In fact, the electrolytic capacitor utilizes the mobility of ions in the electrolytic solution to obtain an electric circuit; therefore, the electrical conductivity of the electrolytic solution is an important factor for deciding performance of the electrolytic capacitor. Such that, it is an issue for how to promote the electrical conductivity of the electrolytic solution to maintain the electrolytic capacitor with high-temperature stability on the solution, the aluminum foils, the separator etc., especially the stability of the solution and the aluminum foils. A typical electrolytic solution for a conventional electrolytic capacitor, especially for those electrolytic capacitors work on a supply voltage under 100V, includes water, organic solvent, organic acid, inorganic acid and some special additives mixed in different proportions.

Moreover, because solid electrolytic capacitor has the advantages of small size, large electrical capacity and good frequency characteristic, it can be used as a decoupling element in the power circuit of a central processing unit. In general, a plurality of capacitor elements is stacked together to form a solid electrolytic capacitor with a high electrical capacity. In addition, the solid electrolytic capacitor of the prior art includes a plurality of capacitor elements and a lead frame. Each capacitor element includes an anode part, a cathode part and an insulating part. The insulating part electrically insulates the anode part and the cathode part from each other. More specifically, the cathode parts of the capacitor elements are stacked over one another. Furthermore, conductive layers are disposed between adjacent capacitor elements so that the capacitor elements are electrically connected to one another.

Furthermore, the winding-type capacitor includes a capacitor element, a packaging material, and a sealing material. The capacitor element has an anode foil coupled to an anode terminal, a cathode foil coupled to a cathode terminal, a separator, and an electrolyte layer. The anode foil, the cathode foil and the separator are rolled together. The separator is between the anode foil and the cathode foil. The electrolyte layer is formed between the anode foil and the cathode foil. The packaging material has an opening and packages the capacitor element. The sealing material has a through hole where the anode terminal and the cathode terminal pass through and seals the opening of the packaging material. A given space is provided between the sealing material and the capacitor element. A stopper for securing the space is provided on at least one of the anode terminal and the cathode terminal

SUMMARY OF THE INVENTION

One of the embodiments of the instant disclosure provides a stacked-type solid electrolytic capacitor package structure, comprising: a capacitor unit, a package unit and a conductive unit. The capacitor unit includes a plurality of capacitors sequentially stacked on top of one another and electrically connected to each other, wherein each capacitor has at least one positive portion and at least one negative portion. The package unit includes a package body enclosing the capacitors, wherein the package body has a top surface defining a package length, a package width and an effective package area obtained by multiplying the package length and the package width, and the package width of the package body is substantially between 85% and 95% of the package length of the package body. The conductive unit includes at least one first conductive terminal electrically connected to the at least one positive portion of the capacitor and at least one second conductive terminal electrically connected to the at least one negative portion of the capacitor, wherein the at least one first conductive terminal and the at least one second conductive terminal are separated from each other, the at least one first conductive terminal has a first embedded portion contacting the at least one positive portion of the capacitor and enclosed by the package body and a first exposed portion connected with the first embedded portion and exposed from the package body, and the at least one second conductive terminal has a second embedded portion contacting the at least one negative portion of the capacitor and enclosed by the package body and a second exposed portion connected with the second embedded portion and exposed from the package body.

Another one of the embodiments of the instant disclosure provides a stacked-type solid electrolytic capacitor package structure, comprising: a capacitor unit, a package unit and a conductive unit. The capacitor unit includes a plurality of first capacitors and a plurality of second capacitors, each first capacitor having at least one positive portion and at least one negative portion, and each second capacitor having at least one positive portion and at least one negative portion, wherein the first capacitors are sequentially stacked on top of one another and electrically connected with each other, and the second capacitors are sequentially stacked on top of one another and electrically connected with each other. The package unit includes a package body enclosing the first and the second capacitors, wherein the package body has a top surface defining a package length, a package width and an effective package area obtained by multiplying the package length and the package width, and the package width of the package body is substantially between 85% and 95% of the package length of the package body. The conductive unit includes at least one first conductive terminal electrically connected to the positive portions of the first and the second capacitors and at least one second conductive terminal electrically connected to the negative portions of the first and the second capacitors, wherein the at least one first conductive terminal and the at least one second conductive terminal are separated from each other, one part of the at least one first conductive terminal and one part of the at least one second conductive terminal are enclosed by the package body, and another part of the at least one first conductive terminal and another part of the at least one second conductive terminal are exposed from the package body, wherein the first capacitors are disposed on the top side of the at least one first conductive terminal and the top side of the at least one second conductive terminal, and the second capacitors are disposed on the bottom side of the at least one first conductive terminal and the bottom side of the at least one second conductive terminal More precisely, each capacitor has a top surface defining a overall length, an overall width and an effective overall area obtained by multiplying the overall length and the overall width, and the at least one negative portion of each capacitor has a top surface defining an negative length, an negative width and an effective negative area, wherein the effective overall area of the capacitor is substantially between 65% and 80% of the effective package area of the package body, the effective negative area of the at least one negative portion is substantially between 42% and 60% of the effective package area of the package body, and the negative width of the at least one negative portion is substantially between 80% and 95% of the package width of the package body.

Therefore, the stacked-type solid electrolytic capacitor package structure of the instant disclosure can be used to provide an optimization percentage of the package length of the package body occupied by the package width of the package body, an optimization percentage of the effective package area of the package body occupied by the effective overall area of the capacitor, an optimization percentage of the effective package area of the package body occupied by the effective negative area of the at least one negative portion, and an optimization percentage of the package width of the package body occupied by the negative width of the at least one negative portion.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

First Embodiment

Figure 1A:
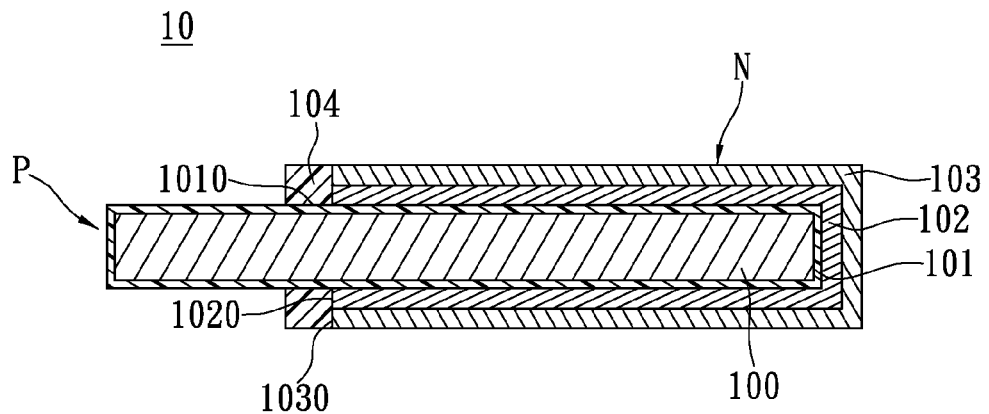
FIG. 1A shows a cross-sectional, schematic view of the capacitor unit according to the first embodiment of the instant disclosure.
Figure 1B:
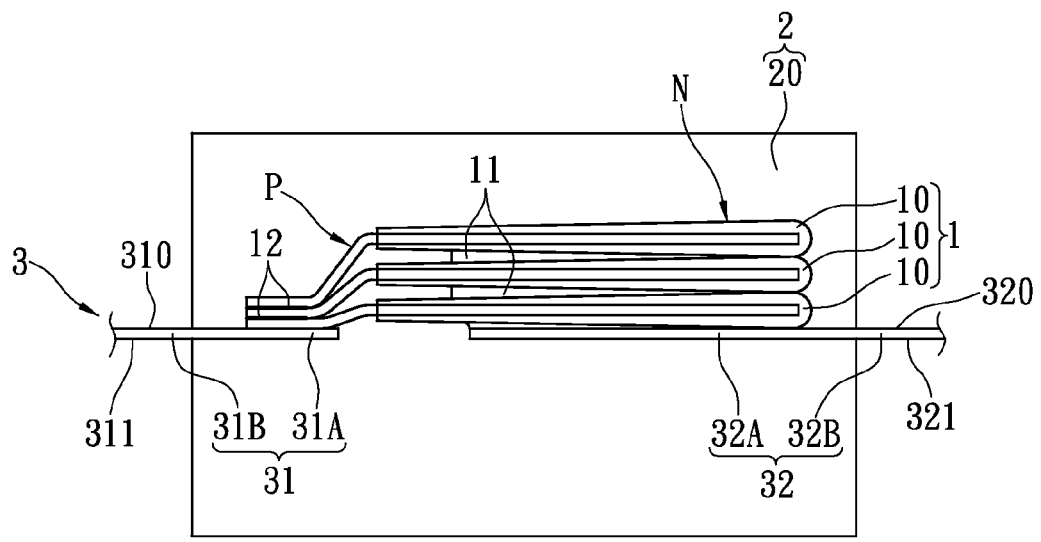
FIG. 1B shows a lateral, schematic view of the stacked-type solid electrolytic capacitor package structure according to the first embodiment of the instant disclosure.
Figure 1C:
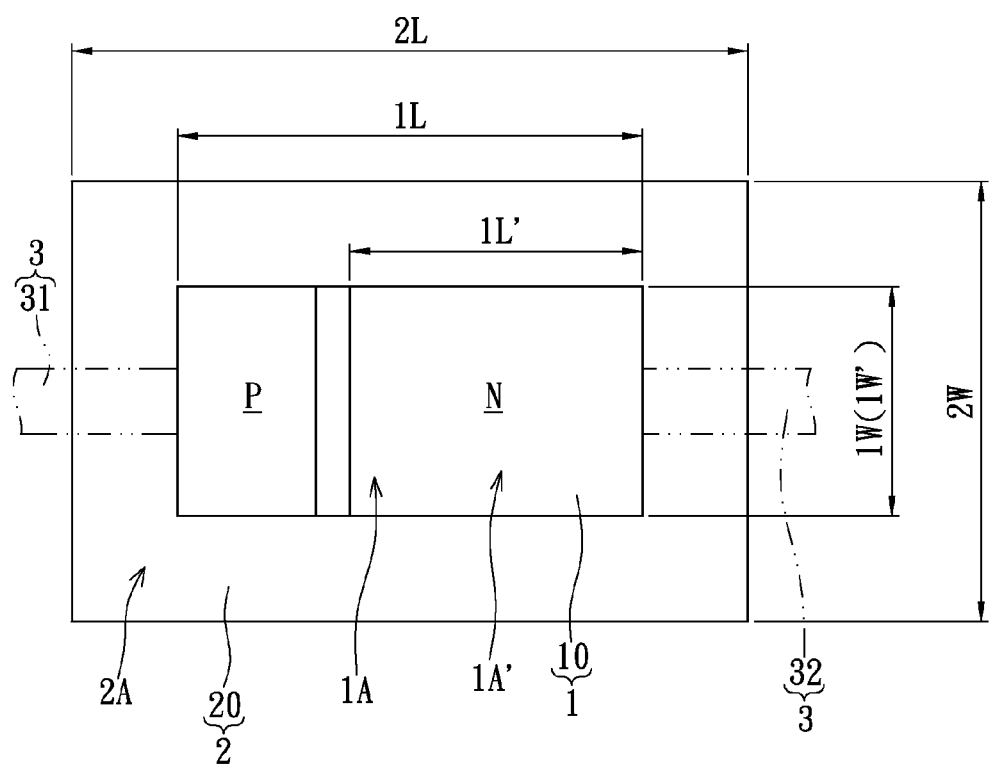
FIG. 1C shows a top, schematic view of the stacked-type solid electrolytic capacitor package structure according to the first embodiment of the instant disclosure.

Referring to FIG. 1A to FIG. 1C, where the first embodiment of the instant disclosure provides a stacked-type solid electrolytic capacitor package structure, comprising: a capacitor unit 1, a package unit 2 and a conductive unit 3.

First, referring to FIG. 1A and FIG. 1B, the capacitor unit 1 includes a plurality of capacitors 10 sequentially stacked on top of one another and electrically connected to each other, and each capacitor 10 has at least one positive portion P and at least one negative portion N. For example, as shown in FIG. 1A, each capacitor 10 includes a valve metal foil 100, an oxide insulation layer 101 enclosing the valve metal foil 100, a conductive polymer layer 102 covering one part of the oxide insulation layer 101, and a carbon glue layer 103 covering the conductive polymer layer 102. In addition, the two negative portions N of the two adjacent capacitors 10 can be stacked on top of one another by conductive glue 11 (such as silver glue) or conductive paste (such as silver paste), and the two positive portions P of the two adjacent capacitors 10 can be stacked on top of one another by a soldering layer 12. Moreover, each capacitor 10 has a surrounding insulating layer 104 disposed on the outer surface of the oxide insulation layer 101 and around the outer surface of the oxide insulation layer 101, and the lengths of the conductive polymer layer 102 and the carbon glue layer 103 of each capacitor 10 is limited by each corresponding surrounding insulating layer 104. More precisely, the oxide insulation layer 101 has a surrounding region 1010 on the outer surface thereof, and the surrounding insulating layer 104 of each capacitor 10 is surroundingly disposed on the surrounding region 1010 of each corresponding oxide insulation layer 101 and contacting an end 1020 of each corresponding conductive polymer layer 102 and an end 1030 of each corresponding carbon glue layer 103.

Moreover, referring to FIGS. 1A and 1B, the package unit 2 includes a package body 20 enclosing the capacitors 10 of the capacitor unit 1. The conductive unit 3 includes at least one first conductive terminal 31 electrically connected to the at least one positive portion P of the capacitor 10 and at least one second conductive terminal 32 electrically connected to the at least one negative portion N of the capacitor 10. In addition, the at least one first conductive terminal 31 and the at least one second conductive terminal 32 are separated from each other, the at least one first conductive terminal 31 has a first embedded portion 31A contacting the at least one positive portion P of the capacitor 10 and enclosed by the package body 20 and a first exposed portion 31B connected with the first embedded portion 31A and exposed from the package body 20, and the at least one second conductive terminal 32 has a second embedded portion 32A contacting the at least one negative portion N of the capacitor 10 and enclosed by the package body 20 and a second exposed portion 32B connected with the second embedded portion 32A and exposed from the package body 20.

More precisely, referring to FIG. 1B and FIG. 1C, the package body 20 has a top surface defining a package length 2L, a package width 2W and an effective package area 2A obtained by multiplying the package length 2L and the package width 2W (i.e., the package length 2L multiplied by the package width 2W equals the effective package area 2A), and the package width 2W of the package body 20 is substantially between 85% and 95% of the package length 2L of the package body 20 (i.e., the percentage of the package length 2L of the package body 20 occupied by the package width 2W of the package body 20 is substantially between 85% and 95%). However, the percentage between 85% and 95% of the package length 2L of the package body 20 occupied by the package width 2W of the package body 20 in the first embodiment is merely an example and is not meant to limit the instant disclosure. For example, when the package length 2L is 73 mm and the package width 2W is 43 mm, the percentage of the package length 2L of the package body 20 occupied by the package width 2W of the package body 20 is substantially about 58%. However, when the package length 2L is the same as 73 mm and the package width 2W is increased from 43 mm to 63 mm, the percentage of the package length 2L of the package body 20 occupied by the package width 2W of the package body 20 can be increased from 58% to 90%.

More precisely, referring to FIG. 1B and FIG. 1C, each capacitor 10 has a top surface defining a overall length 1L, an overall width 1W and an effective overall area 1A obtained by multiplying the overall length 1L and the overall width 1W (i.e., the overall length 1L multiplied by the overall width 1W equals the effective overall area 1A), the effective overall area 1A of the capacitor 10 is substantially between 65% and 80% of the effective package area 2A of the package body 20 (i.e., the percentage of the effective package area 2A of the package body 20 occupied by the effective overall area 1A of the capacitor 10 is substantially between 65% and 80%). However, the percentage between 65% and 80% of the effective package area 2A of the package body 20 occupied by the effective overall area 1A of the capacitor 10 in the first embodiment is merely an example and is not meant to limit the instant disclosure.

More precisely, referring to FIG. 1B and FIG. 1C, the at least one negative portion N of each capacitor 10 has a top surface defining an negative length 1L', an negative width 1W' and an effective negative area 1A' (i.e., the negative length 1L' multiplied by the negative width 1W' equals the effective negative area 1A'), where the effective negative area 1A' of the at least one negative portion N is substantially between 42% and 60% of the effective package area 2A of the package body 20 (i.e., the percentage of the effective package area 2A of the package body 20 occupied by the effective negative area 1A' of the at least one negative portion N is substantially between 42% and 60%), and the negative width 1W' of the at least one negative portion N is substantially between 80% and 95% of the package width 2W of the package body 20 (i.e., the percentage of the package width 2W of the package body 20 occupied by the negative width 1W' of the at least one negative portion N is substantially between 80% and 95%). However, the percentage between 42% and 60% of the effective package area 2A of the package body 20 occupied by the effective negative area 1A' of the at least one negative portion N or the percentage between 80% and 95% of the package width 2W of the package body 20 occupied by the negative width 1W' of the at least one negative portion N in the first embodiment is merely an example and is not meant to limit the instant disclosure.

Second Embodiment

Figure 2A:
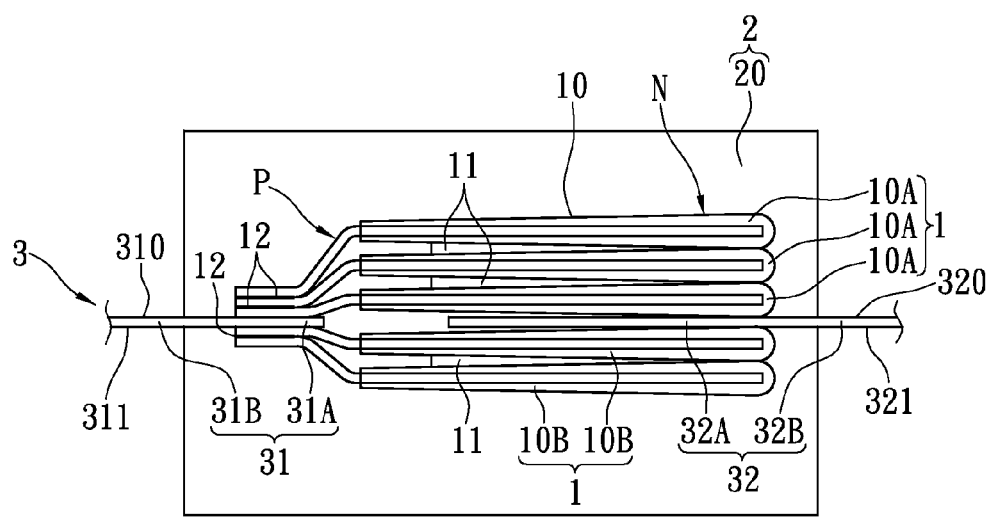
FIG. 2A shows a lateral, schematic view of the stacked-type solid electrolytic capacitor package structure according to the second embodiment of the instant disclosure.
Figure 2B:
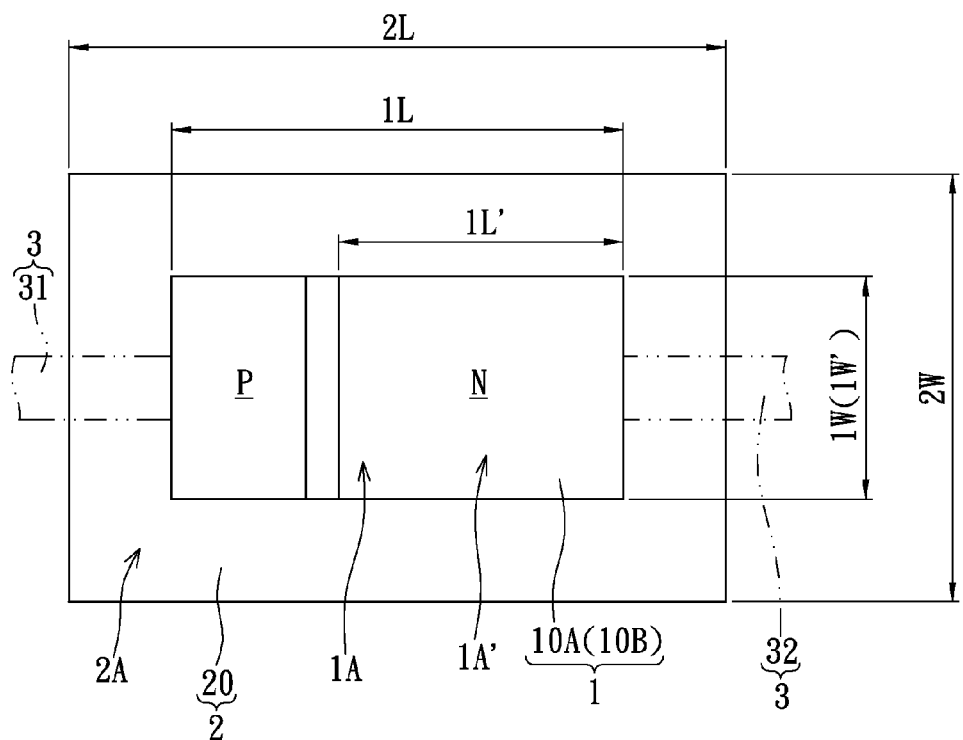
FIG. 2B shows a top, schematic view of the stacked-type solid electrolytic capacitor package structure according to the second embodiment of the instant disclosure.

Referring to FIG. 2A and FIG. 2B, where the second embodiment of the instant disclosure provides a stacked-type solid electrolytic capacitor package structure, comprising: a capacitor unit 1, a package unit 2 and a conductive unit 3.

First, referring to FIG. 2A and FIG. 2B, the capacitor unit 1 includes a plurality of first capacitors 10A and a plurality of second capacitors 10B. Each first capacitor 10A has at least one positive portion P and at least one negative portion N, and each second capacitor 10B has at least one positive portion P and at least one negative portion N. The first capacitors 10A are sequentially stacked on top of one another and electrically connected with each other, and the second capacitors 10B are sequentially stacked on top of one another and electrically connected with each other. More precisely, the two negative portions N of the two adjacent capacitors (10A or 10B) can be stacked on top of one another by conductive glue 11 (such as silver glue) or conductive paste (such as silver paste), and the two positive portions P of the two adjacent capacitors (10A or 10B) can be stacked on top of one another by a soldering layer 12.

Moreover, referring to FIG. 2A and FIG. 2B, the package unit 2 includes a package body 20 enclosing the first and the second capacitors (10A, 10B). The conductive unit 3 includes at least one first conductive terminal 31 electrically connected to the positive portions P of the first and the second capacitors (10A, 10B) and at least one second conductive terminal 32 electrically connected to the negative portions N of the first and the second capacitors (10A, 10B). In addition, the at least one first conductive terminal 31 and the at least one second conductive terminal 32 are separated from each other, one part of the at least one first conductive terminal 31 and one part of the at least one second conductive terminal 32 are enclosed by the package body 20, and another part of the at least one first conductive terminal 31 and another part of the at least one second conductive terminal 32 are exposed from the package body 20. Moreover, the first capacitors 10A are disposed on the top side 310 of the at least one first conductive terminal 31 and the top side 320 of the at least one second conductive terminal 32, and the second capacitors 10B are disposed on the bottom side 311 of the at least one first conductive terminal 31 and the bottom side 321 of the at least one second conductive terminal 32.

More precisely, referring to FIG. 2A and FIG. 2B, the package body 20 has a top surface defining a package length 2L, a package width 2W and an effective package area 2A obtained by multiplying the package length 2L and the package width 2W (i.e., the package length 2L multiplied by the package width 2W equals the effective package area 2A), and the package width 2W of the package body 20 is substantially between 85% and 95% of the package length 2L of the package body 20 (i.e., the percentage of the package length 2L of the package body 20 occupied by the package width 2W of the package body 20 is substantially between 85% and 95%). However, the percentage between 85% and 95% of the package length 2L of the package body 20 occupied by the package width 2W of the package body 20 in the first embodiment is merely an example and is not meant to limit the instant disclosure. For example, when the package length 2L is 73 mm and the package width 2W is 43 mm, the percentage of the package length 2L of the package body 20 occupied by the package width 2W of the package body 20 is substantially about 58%. However, when the package length 2L is the same as 73 mm and the package width 2W is increased from 43 mm to 63 mm, the percentage of the package length 2L of the package body 20 occupied by the package width 2W of the package body 20 can be increased from 58% to 90%.

More precisely, referring to FIG. 2A and FIG. 2B, each capacitor (10A or 10B) has a top surface defining a overall length 1L, an overall width 1W and an effective overall area 1A obtained by multiplying the overall length 1L and the overall width 1W (i.e., the overall length 1L multiplied by the overall width 1W equals the effective overall area 1A), the effective overall area 1A of the capacitor (10A or 10B) is substantially between 65% and 80% of the effective package area 2A of the package body 20 (i.e., the percentage of the effective package area 2A of the package body 20 occupied by the effective overall area 1A of the capacitor (10A or 10B) is substantially between 65% and 80%). However, the percentage between 65% and 80% of the effective package area 2A of the package body 20 occupied by the effective overall area 1A of the capacitor (10A or 10B) in the first embodiment is merely an example and is not meant to limit the instant disclosure.

More precisely, referring to FIG. 2A and FIG. 2B, the at least one negative portion N of each capacitor (10A or 10B) has a top surface defining an negative length 1L', an negative width 1W' and an effective negative area 1A' (i.e., the negative length 1L' multiplied by the negative width 1W' equals the effective negative area 1A'), where the effective negative area 1A' of the at least one negative portion N is substantially between 42% and 60% of the effective package area 2A of the package body 20 (i.e., the percentage of the effective package area 2A of the package body 20 occupied by the effective negative area 1A' of the at least one negative portion N is substantially between 42% and 60%), and the negative width 1W' of the at least one negative portion N is substantially between 80% and 95% of the package width 2W of the package body 20 (i.e., the percentage of the package width 2W of the package body 20 occupied by the negative width 1W' of the at least one negative portion N is substantially between 80% and 95%). However, the percentage between 42% and 60% of the effective package area 2A of the package body 20 occupied by the effective negative area 1A' of the at least one negative portion N or the percentage between 80% and 95% of the package width 2W of the package body 20 occupied by the negative width 1W' of the at least one negative portion N in the first embodiment is merely an example and is not meant to limit the instant disclosure.

For example, when the first capacitors 10A and the second capacitors 10B are disposed on the top side 310 of the at least one first conductive terminal 31 and the top side 320 of the at least one second conductive terminal 32, the first capacitors 10A and the second capacitors 10B are alternately stacked on top of one another. In addition, each first capacitor 10A includes a first positive portion P electrically connected to the first conductive terminal 31 and a first negative portion N electrically connected to the second conductive terminal 32, the first positive portion P has a first positive pin extended outwardly along a first predetermined direction, and the first positive pins of the first positive portions P are alternately stacked on top of one another. Each second capacitor 10B includes a second positive portion P electrically connected to the first conductive terminal 31 and a second negative portion N electrically connected to the second conductive terminal 32, the second positive portion P has a second positive pin extended outwardly along a second predetermined direction, the second positive pins of the second positive portions P are alternately stacked on top of one another and separated from the first positive pins of the first positive portions P, and the first predetermined direction and the second predetermined direction are different direction. For one embodiment, the first negative portion N has a first negative pin extended outwardly along a third predetermined direction, the first negative pins of the first negative portions N are alternately stacked on top of one another, the second negative portion N has a second negative pin extended outwardly along a fourth predetermined direction, the second negative pins of the second negative portions N are alternately stacked on top of one another and separated from the first negative pins of the first negative portions N, and the third predetermined direction and the fourth predetermined direction are different direction. For another embodiment, the first negative portion N has a first negative pin extended outwardly along a third predetermined direction, the second negative portion N has a second negative pin extended outwardly along a fourth predetermined direction, the third predetermined direction and the fourth predetermined direction are the same direction, and the first negative pins and the second negative pins of the second negative portions N are alternately stacked on top of one another.

In conclusion, the stacked-type solid electrolytic capacitor package structure of the instant disclosure can be used to provide an optimization percentage of the package length of the package body occupied by the package width of the package body, an optimization percentage of the effective package area of the package body occupied by the effective overall area of the capacitor, an optimization percentage of the effective package area of the package body occupied by the effective negative area of the at least one negative portion, and an optimization percentage of the package width of the package body occupied by the negative width of the at least one negative portion.

The above-mentioned descriptions merely represent the preferred embodiments of the instant disclosure, without any intention or ability to limit the scope of the instant disclosure which is fully described only within the following claims Various equivalent changes, alterations or modifications based on the claims of instant disclosure are all, consequently, viewed as being embraced by the scope of the instant disclosure.

What is claimed is:

1. A stacked-type solid electrolytic capacitor package structure, comprising:
    a capacitor unit including a plurality of capacitors sequentially stacked on top of one another and electrically connected to each other, wherein each capacitor has at least one positive portion and at least one negative portion;
    a package unit including a package body enclosing the capacitors, wherein the package body has a top surface defining a package length, a package width and an effective package area obtained by multiplying the package length and the package width, and the package width of the package body is substantially between 85% and 95% of the package length of the package body; and
    a conductive unit including at least one first conductive terminal electrically connected to the at least one positive portion of the capacitor and at least one second conductive terminal electrically connected to the at least one negative portion of the capacitor, wherein the at least one first conductive terminal and the at least one second conductive terminal are separated from each other, the at least one first conductive terminal has a first embedded portion contacting the at least one positive portion of the capacitor and enclosed by the package body and a first exposed portion connected with the first embedded portion and exposed from the package body, and the at least one second conductive terminal has a second embedded portion contacting the at least one negative portion of the capacitor and enclosed by the package body and a second exposed portion connected with the second embedded portion and exposed from the package body.

2. The stacked-type solid electrolytic capacitor package structure of claim 1, wherein each capacitor has a top surface defining a overall length, an overall width and an effective overall area obtained by multiplying the overall length and the overall width, and the at least one negative portion of each capacitor has a top surface defining an negative length, an negative width and an effective negative area, wherein the effective overall area of the capacitor is substantially between 65% and 80% of the effective package area of the package body, the effective negative area of the at least one negative portion is substantially between 42% and 60% of the effective package area of the package body, and the negative width of the at least one negative portion is substantially between 80% and 95% of the package width of the package body.

3. The stacked-type solid electrolytic capacitor package structure of claim 1, wherein each capacitor includes a valve metal foil, an oxide insulation layer enclosing the valve metal foil, a conductive polymer layer covering one part of the oxide insulation layer, and a carbon glue layer covering the conductive polymer layer, the two negative portions of the two adjacent capacitors are stacked on top of one another by conductive glue, and the two positive portions of the two adjacent capacitors are stacked on top of one another by a soldering layer.

4. The stacked-type solid electrolytic capacitor package structure of claim 3, wherein each capacitor has a surrounding insulating layer disposed on the outer surface of the oxide insulation layer and around the outer surface of the oxide insulation layer, and the lengths of the conductive polymer layer and the carbon glue layer of each capacitor is limited by each corresponding surrounding insulating layer.

5. The stacked-type solid electrolytic capacitor package structure of claim 4, wherein the oxide insulation layer has a surrounding region on the outer surface thereof, and the surrounding insulating layer of each capacitor is surroundingly disposed on the surrounding region of each corresponding oxide insulation layer and contacting an end of each corresponding conductive polymer layer and an end of each corresponding carbon glue layer.

6. A stacked-type solid electrolytic capacitor package structure, comprising:
a capacitor unit including a plurality of first capacitors and a plurality of second capacitors, each first capacitor having at least one positive portion and at least one negative portion, and each second capacitor having at least one positive portion and at least one negative portion, wherein the first capacitors are sequentially stacked on top of one another and electrically connected with each other, and the second capacitors are sequentially stacked on top of one another and electrically connected with each other;
a package unit including a package body enclosing the first and the second capacitors, wherein the package body has a top surface defining a package length, a package width and an effective package area obtained by multiplying the package length and the package width, and the package width of the package body is substantially between 85% and 95% of the package length of the package body; and
a conductive unit including at least one first conductive terminal electrically connected to the positive portions of the first and the second capacitors and at least one second conductive terminal electrically connected to the negative portions of the first and the second capacitors, wherein the at least one first conductive terminal and the at least one second conductive terminal are separated from each other, one part of the at least one first conductive terminal and one part of the at least one second conductive terminal are enclosed by the package body, and another part of the at least one first conductive terminal and another part of the at least one second conductive terminal are exposed from the package body, wherein the first capacitors are disposed on the top side of the at least one first conductive terminal and the top side of the at least one second conductive terminal, and the second capacitors are disposed on the bottom side of the at least one first conductive terminal and the bottom side of the at least one second conductive terminal.

7. The stacked-type solid electrolytic capacitor package structure of claim 6, wherein each capacitor has a top surface defining a overall length, an overall width and an effective overall area obtained by multiplying the overall length and the overall width, and the at least one negative portion of each capacitor has a top surface defining an negative length, an negative width and an effective negative area, wherein the effective overall area of the capacitor is substantially between 65% and 80% of the effective package area of the package body, the effective negative area of the at least one negative portion is substantially between 42% and 60% of the effective package area of the package body, and the negative width of the at least one negative portion is substantially between 80% and 95% of the package width of the package body.

8. The stacked-type solid electrolytic capacitor package structure of claim 6, wherein each capacitor includes a valve metal foil, an oxide insulation layer enclosing the valve metal foil, a conductive polymer layer covering one part of the oxide insulation layer, and a carbon glue layer covering the conductive polymer layer, the two negative portions of the two adjacent capacitors are stacked on top of one another by conductive glue, and the two positive portions of the two adjacent capacitors are stacked on top of one another by a soldering layer.

9. The stacked-type solid electrolytic capacitor package structure of claim 8, wherein each capacitor has a surrounding insulating layer disposed on the outer surface of the oxide insulation layer and around the outer surface of the oxide insulation layer, and the lengths of the conductive polymer layer and the carbon glue layer of each capacitor is limited by each corresponding surrounding insulating layer.

10. The stacked-type solid electrolytic capacitor package structure of claim 9, wherein the oxide insulation layer has a surrounding region on the outer surface thereof, and the surrounding insulating layer of each capacitor is surroundingly disposed on the surrounding region of each corresponding oxide insulation layer and contacting an end of each corresponding conductive polymer layer and an end of each corresponding carbon glue layer.

* * * * *